United States Patent [19]

Bae

[11] Patent Number: 5,404,169
[45] Date of Patent: Apr. 4, 1995

[54] METHOD AND APPARATUS FOR CONVERTING SCANNING LINE OF A VIDEO SIGNAL RECEIVER

[75] Inventor: Jum H. Bae, Kyungki, Rep. of Korea

[73] Assignee: Samsung Electronics Co., Ltd., Kyungki, Rep. of Korea

[21] Appl. No.: 985,954

[22] Filed: Dec. 4, 1992

[30] Foreign Application Priority Data

Dec. 4, 1991 [KR] Rep. of Korea .................... 91-22088

[51] Int. Cl.6 ...................... H04N 7/01; H04N 11/20
[52] U.S. Cl. .................................. 348/443; 348/454; 348/458
[58] Field of Search ............ 358/11, 140; H04N 7/01, H04N 11/20; 348/443, 454, 458

[56] References Cited

U.S. PATENT DOCUMENTS

| | | | |
|---|---|---|---|
| 4,057,835 | 11/1977 | Kinuhata | 348/458 |
| 4,617,597 | 10/1986 | Lippel | 358/310 |
| 4,694,337 | 9/1987 | Lyons | 348/458 |

FOREIGN PATENT DOCUMENTS

| | | | |
|---|---|---|---|
| 0476683 | 4/1992 | European Pat. Off. | H04N 7/01 |
| 4150485 | 5/1992 | Japan | H04N 7/01 |
| 2255254 | 10/1992 | United Kingdom | H04N 7/01 |

OTHER PUBLICATIONS

R. E. Davies "Full Screen TV Standards Converter" Wireless World, Jan. 1969.
K. H. Barratt and J. H. Tayler "Line Interpolation" IBA Tech Rev. GB No. 8 Sep. 1976.

*Primary Examiner*—Victor R. Kostak
*Assistant Examiner*—Nathan J. Flynn
*Attorney, Agent, or Firm*—Sughrue, Mion, Zinn, Macpeak & Seas

[57] ABSTRACT

A scanning line converting apparatus for converting between NTSC and PAL formats includes a plurality of line memories, an arithmetic circuit and a picture memory. Switches in the lines connecting these elements permits the order of connection to be shifted between first and second states. When converting from the PAL system to the NTSC system, 5 lines are formed by varying the mutual signal ration of 2 lines for every 6 lines, while, when converting from the NTSC system to the PAL system, 6 lines are formed by varying the ratio of 2 lines for every 5 lines, thereby making it possible to convert the lines of one field of different broadcasting methods when actually scanning the picture tube. The ratios used in computations performed by the arithmetic circuit are related to horizontal synchronizing signals and to vertical blanking signals, while they are also related to constants which are furnished by a percent block. A method for converting between different broadcasting formats is also described.

14 Claims, 3 Drawing Sheets

METHOD AND APPARATUS FOR CONVERTING SCANNING LINE OF A VIDEO SIGNAL RECEIVER

FIELD OF THE INVENTION

The present invention relates to a video signal receiver, and particularly to a scanning line converting method for video signals and an apparatus therefor, in which the horizontal lines can be converted in such a manner as to be applied to both NTSC and PAL systems.

The disclosure of Korean patent application 91-22088, filed Dec. 4, 1992, is incorporated herein by reference.

BACKGROUND OF THE INVENTION

As is well known, television broadcasting systems are not unified all over the world. There are basically three television systems depending on the transmission format of the color signal. Therefore, there has arisen a demand for a system which can be used universally throughout all the regions.

In order to meet such a demand, there has been developed a technique in which an NTSC system can be used in an area of the PAL system, and in which the PAL system can be used in an area of the NTSC system. U.S. Patent No. 4,617,597 discloses such a technique in which different broadcasting systems can be used in different areas using the NTSC or PAL systems.

As is well known, the NTSC system and the PAL system are significantly different with respect to their number of scanning lines, that of the former being 525, and that of the latter being 625.

When the NTSC system is converted to the PAL system, the number of scanning lines is increased from 525 to 625, while, when the PAL system is converted to the NTSC system, the number of scanning lines is decreased from 625 to 525. However, in such a case, the picture becomes unstable, and the reproducing precision is deteriorated.

That is, when the number of scanning lines is increased from 525 to 625, one line is stored for every 5 lines, and the scanning is carried out in an overlapping manner. Thus, if 6-line scanning is performed, a scanning of 525 lines becomes equivalent to a scanning of 625 lines.

Further, when the number of scanning lines is decreased from 625 lines to 525 lines, one line is deleted during scanning of every 6 lines, so that actually 525 lines should be scanned when a scanning of 625 lines is performed.

However, in the above cases of conversion, either the same scanning line is scanned a second time, or scanning lines are deleted, and therefore, the picture is reproduced in imperfect form and becomes unstable.

Particularly, in a large scale picture tube, such instability of the picture is a serious problem.

SUMMARY OF THE INVENTION

The present invention is intended to overcome the above described disadvantages of the conventional techniques.

Therefore it is an object of the present invention to provide a scanning line converting method for video signals and an apparatus therefor, in which, even if scanning line conversions are carried out in accordance with the television broadcasting method, the regenerating precision can be kept at a high level, without being limited by the area characteristics.

In achieving the above object, the line converting method for video signals according to the present invention includes: an N+1 unit converting step of forming N lines from N+1 lines after adding one line by varying the mutual video signal ratio using two overlapped scanning lines; and one field line converting step of decreasing one field of lines to N/(N+1) by carrying out the N+1 unit converting step for every N+1 lines, thereby converting K lines of the PAL system (K being the number of the scanning lines loaded with actual video signals based on the PAL system) to M lines of NTSC system (M is the number of the scanning lines loaded with actual video signals based on the NTSC system).

The scanning line converting method for video signals according to the present invention further includes: an N unit converting step of forming N+! lines from N lines by varying the mutual video signals ration using two overlapped scanning lines; and one field line converting step of increasing the number of lines for one field to (N+1)/N by carrying out a 5-unit conversion for every N lines, thereby converting M lines of the NTSC system (M is the number of the scanning lines loaded with actual video signals base on the NTSC system) to K lines of the PAL system (K is the number of the scanning lines loaded with actual video signals based on the PAL system).

In achieving the above object, the scanning line converting apparatus for video signals according to the present invention includes: an A/D converting circuit for converting Y and C signals to digital signals; a line memory section for storing 1H lines, and for providing 1H delayed data; a percent block of providing ratios for respective H lines; an arithmetic circuit for providing line-converted outputs by computing outputs such as line constants the percent block, digital signals including Y and C signals output from the A/D converting circuit, and 1H delayed outputs from the line memory; and a picture memory for receiving the output of the arithmetic circuit, and for storing and providing picture data under the control of memory control holding signals furnished by the percent block.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
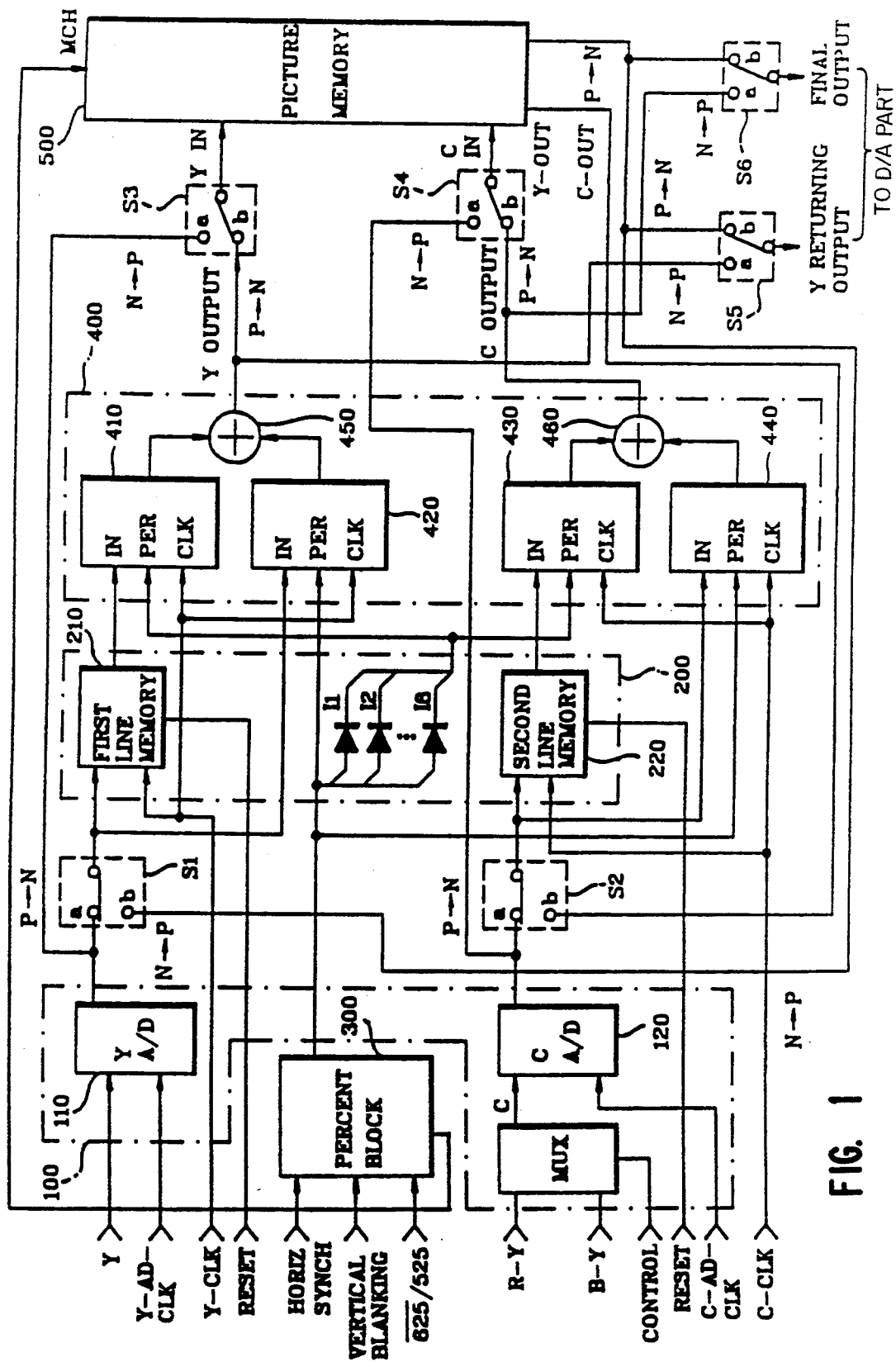
FIG. 1 is a block diagram showing the total constitution of the scanning line converting apparatus according to the present invention.

The ratios of the scanning lines for different broadcasting systems will be described below, for the case where 625 lines (PAL system) are converted to 525 lines (NTSC system), or where 525 lines are converted to 625 lines. That is, in the PAL system, the number of the total scanning lines is 625, and the number of the scanning lines for one field is 312.5.

However, the number of the scanning lines loaded with actual video signals is about 288 for each field, the rest of lines being used of vertical synchronization.

Meanwhile, in the NTSC system the number of the total scanning lines is 525, and the number of the scanning lines for each field is 262.5, while the number of the scanning lines loaded with actual video signals is about 243.

Therefore, it can be seen that the proximate ratio of the scanning lines between the PAL and NTSC systems is 6:5.

Now it will be assumed that K=288, M=243 and N=5, and these constants for the line conversions will be applied to the PAL and NTSC systems. At first, the method of converting the PAL system into the NTSC system will be described. The 288 lines, which contain active video out of 312.5 scanning lines, corresponding to one field in the PAL system, are converted into 243 lines containing active video of 262.5 scanning lines corresponding to one field in the NTSC system. Based on a ratio of 6:5, which is an approximate ratio corresponding to the ratio 288:243, 6 lines are taken as the converting unit and are converted into 5 lines.

A unit of 6 lines from the PAL system is converted into a corresponding unit of 5 lines in the NTSC system by providing a delay of one horizontal line (1H) to each PAL line, and combining successive PAL lines in the 6 line unit to form each line in the 5 line NTSC unit. The successive lines are combined in accordance with a mutual video signal ratio that varies for each of the line pairs combined. For example, PAL lines 1 and 2 combine according to a ratio to form NTSC line 1. PAL lines 2 and 3 combine according to another ratio to form NTSC line 2, etc. through PAL line 6 and NTSC line 5. Then the conversion repeats for PAL lines 7–12 and NTSC lines 6–10, and so forth through the conversion of 288 PAL lines into 243 NTSC lines.

Further, this 6-unit converting process is carried out for the whole of the 288 lines taking 6 lines as one unit, so that the number of lines for each field should be decreased to 5/6, thereby completing a line converting process for one field. Thus, the number of lines for one field is decreased from 288 to 243, and this is shown in Table 1 below in detail.

TABLE 1

| PAL | NTSC | | |
|---|---|---|---|
| | | Converting Formula | |
| Line No. | Line No. | 1H Delay | Current |
| 1p | | ×× + ×× | |
| 2p | 1n | 1p × 0.833 + 2p × 0.166 | |
| 3p | 2n | 2p × 0.66 + 3p × 0.33 | |
| 4p | 3n | 3p × 0.5 + 4p × 0.5 | |
| 5p | 4n | 4p × 0.33 + 5p × 0.66 | |
| 6p | 5n | 5p × 0.166 + 6p × 0.8333 | |
| 7p | | ×× + ×× | |
| 8p | 6n | 7p × 0.833 + 8p × 0.166 | |
| 9p | 7n | 8p × 0.66 + 9p × 0.33 | |
| : | : | : | |

*In the line number columns, p indicates the scanning lines of the PAL system, while n indicates those of the NTSC system; × × indicates a space, and × is a multiplier.

One line of the PAL system has a value of 0.833 (5/6) relative to one line of the NTSC system. In the converting formula of Table 1, the sum of the constants of the right side terms is equal to one, and therefore, the above conversion formulae can be established.

If conversions are carried out as previously described, the data of all 6 lines of the PAL system is wholly included in the data of 5 lines of the NTSC system, and, when the computations are carried out, the data is delayed by 1H.

A method of converting video signals from the NTSC system to the PAL system is carried out in the manner described below. Here, the ratio of the scanning lines of the NTSC system to that of the PAL system is 5 to 6, and therefore, one line of the NTSC system has a value of 6/5 relative to one line of the PAL system.

This conversion method is carried out in such a manner that the mutual video signal ratio is varied using two overlapped scanning lines so as for them to form one line each, and thus, there is executed a 5-unit conversion process in which 6 lines is formed using 5 lines.

The number of the lines is converted from 243 to 288, thereby forming the scanning lines of one field based on the PAL system.

Table 2 below shows the formulae for the method of converting video signals from the NTSC system to the PAL system. As can be seen from Table 2, within each 5 line NTSC unit conversion, the first PAL line (1p) is the same as the first NTSC line (1n), and the sixth PAL line (6p) is the same as the fifth NTSC line (5n), delayed by one horizontal line. Lines 2p through 5p are formed by combinations of two NTSC lines each.

TABLE 2

| NTSC | PAL | | |
|---|---|---|---|
| | | Converting Formula | |
| Line No. | Line No. | 1H Delay | Current |
| 1n | 1p | 0 + 1n × 1 | |
| 2n | 2p | 1n × 0.2 + 2n × 0.8 | |
| 3n | 3p | 2n × 0.4 + 3n × 0.6 | |
| 4n | 4p | 3n × 0.6 + 4n × 0.4 | |
| 5n | 5p | 4n × 0.8 + 5n × 0.2 | |
| | 6p | 5n + 0 | |
| 6n | 7p | 0 + 6n × 1 | |
| 7n | 8p | 6n × 0.2 + 7n × 0.8 | |
| : | : | : | |

PAL system includes 5 lines of the NTSC system.

FIG. 1 is a block diagram showing the constitution of the line converting apparatus of the video signal receiver according to the present invention, which is capable of carrying out conversions from the NTSC system to the PAL system, and vice versa.

The apparatus of FIG. 1 includes: an A/D converting circuit 100 for converting Y (luminance) signals and C (chrominance) signals to digital signals; a line memory section 200 for storing 1H lines, and for providing data delayed by 1H; a percent block 300 for providing ratios for every H lines; an arithmetic circuit 400 for providing line-converted outputs after computing outputs such as the respective line constants of the percent block 300, the digital signals of Y and C signals of the A/D converting circuit 100, and 1H delayed outputs of the line memory section 200; and a picture memory section 500 of receiving the outputs of the arithmetic circuit 400, and for storing and providing picture data under the control of the percent block 300.

The A/D converting circuit 100 includes: a Y A/D converter 110 for converting Y signals to digital signals after receipt of Y clocks; a multiplexer MUX for multiplexing R-Y and B-Y signals; and a C A/D converter 120 for converting the output C of the multiplexer MUX to digital signals after receipt of C clocks.

The line memory section 200 includes: a line memory 210 for receiving Y clocks and storing the output of the Y A/D converter 110, and for providing 1H delayed signals; and a line memory 220 for receiving C clocks and storing the output signals of the C A/D converter 120, and for providing 1H delayed signals.

The arithmetic circuit 400 includes: first and second arithmetic units 410 and 420 for carrying out computations after receipt of 1H delayed Y signals from the line memory 210, and after receipt of constants for the respective lines from the percent block 300; and adding section 450 for providing converted Y signals by summing up the outputs of the first and second arithmetic units 410 and 420; third and fourth arithmetic units 430 and 440 for carrying out computations after receipt of 1H delayed C signals from the line memory 220, and after receipt of constants for the respective lines from the percent block 300; and an adding section 460 for providing converted C signals by summing up the outputs of the third and fourth arithmetic units 430 and 440.

Figure 2:
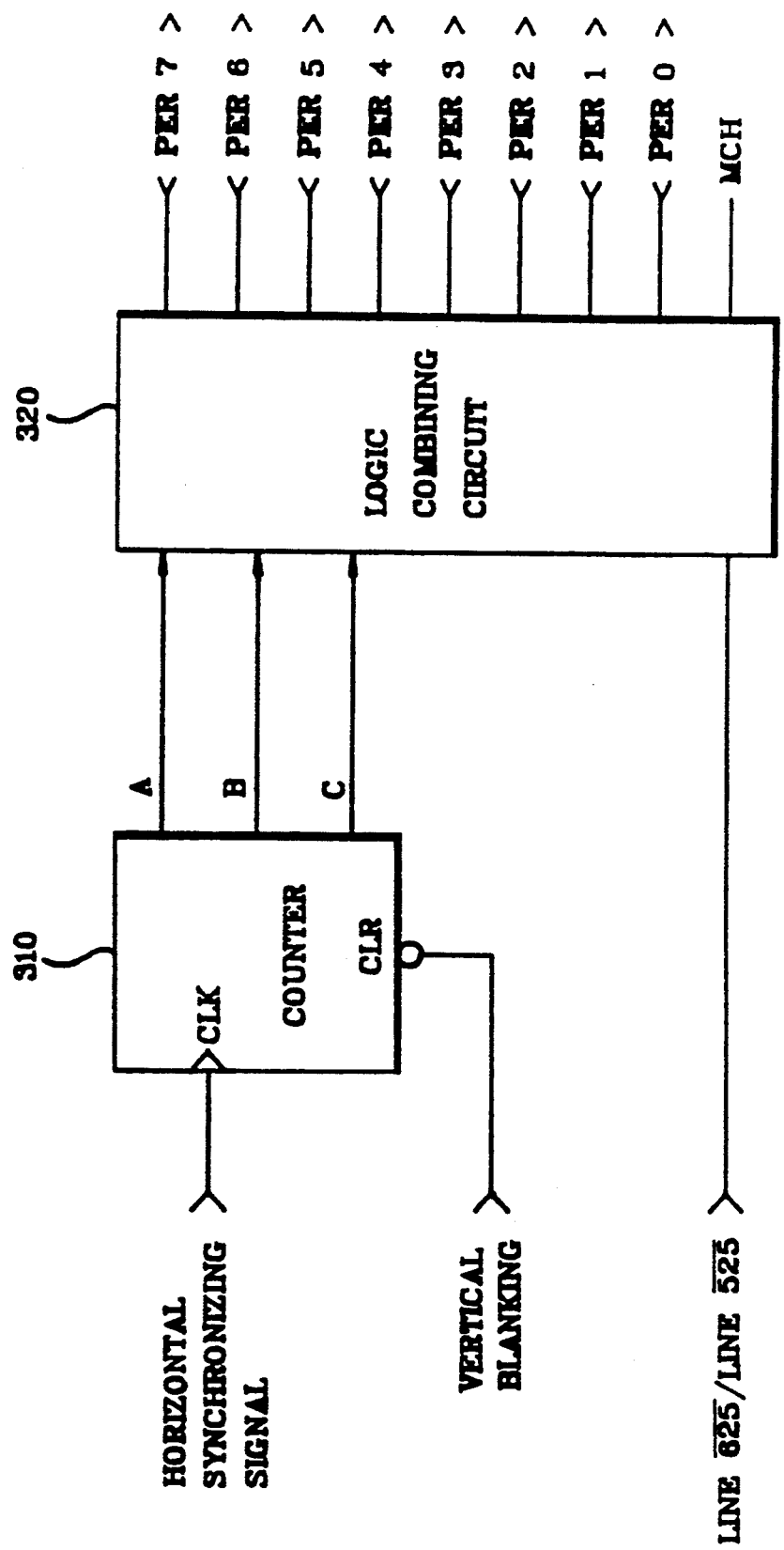
FIG. 2 is a detailed diagram illustrating the percent block of FIG. 1.

The percent block 300 shown in FIG. 2 includes: a counter 310 which is cleared by vertical blanking signals, and which includes logic having the same pattern for every 6 horizontal synchronizing periods by carrying out a count upon receipt of horizontal synchronizing signals as clocks; and a logic combining circuit 320 for converting the respective ratios of the outputs of the counter 310 in accordance with the incoming scanning lines, and for generating control holding signals.

Figure 3:
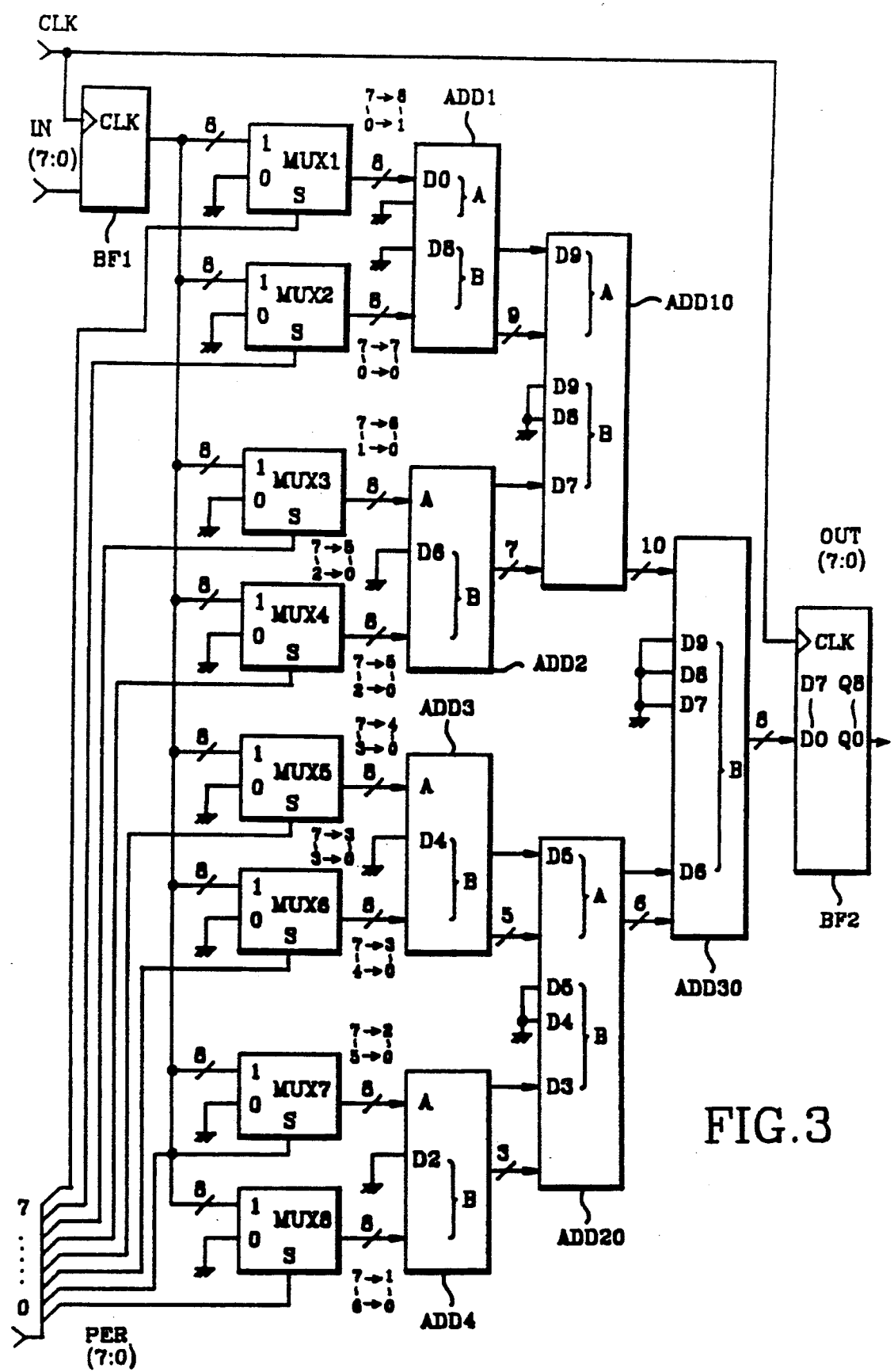
FIG. 3 is a detailed diagram illustrating the arithmetic block of FIG. 1.

Meanwhile, each of the first, second, third and fourth arithmetic units 410, 420, 430 and 440 is constituted as shown in FIG. 3.

That is, each of them includes: a buffer BF1 for providing the output signals of the line memory section 200 in accordance with clocks; multiplexers MUX1–MUX8 for providing outputs of different numbers of bits after multiplexing the one bit signals of the outputs of the percent block 300 and the buffer BF1; a first adder ADD1 for providing 9-bit outputs by summing up 2-input 8-bit outputs of the multiplexers MUX1 and MUX2; a second adder ADD2 for providing 7-bit outputs by summing up 7-bit outputs of the multiplexer MUX3 and 6-bit outputs of the multiplexer MUX4; a third adder ADD3 for providing 5-bit outputs by summing up 5-bit outputs of the multiplexer MUX5 and 4-bit outputs of the multiplexer MUX6; and a fourth adder ADD4 for providing 3-bit outputs by summing up 3-bit outputs of the multiplexer MUX7 and 2-bit outputs of the multiplexer MUX8.

Each of the arithmetic units further includes: an adder ADD10 for providing 10-bit outputs by summing up 9-bit outputs of the first adder ADD1 and 7-bit outputs of the second adder ADD2; an adder ADD20 for providing 6-bit outputs by summing up 5-bit outputs of the third adder ADD3 and 3-bit outputs of the fourth adder ADD4; an adder ADD30 for generating an output of the upper 8 bits by summing up the 10-bit outputs of the adder ADD10 and the 6-bit outputs of the adder ADD20; and a buffer BF2 for providing the 8-bit outputs of the adder ADD30 in accordance with clock signals.

Referring back to FIG. 1, switches S1–S4 are installed at: the output sides of the Y A/D converter 110, the line memory 210, the C A/D converter 120, the line memory 220 and the adding section 450; the Y input terminal of the picture memory 500; the output side of the adding section 460; and the C input terminal of the picture memory 500.

Further, the Y and C output terminals of the picture memory 500 and the Y and C output terminals of the adding sections 450 and 460 are selected by switches S5 and S6 in such a manner as to be connected to a D/A converter (not shown).

The switches S1–S6 are provided with two selecting terminals "a" and "b" and the selecting terminal "a" is selected when converting from the PAL system to the NTSC systems, while the selecting terminal "b" is selected when converting from the NTSC system to the PAL system.

More specifically, the selecting terminals a of the switches S1 and S2 are connected respectively to the selecting terminals "b" of the switches S3 and S4, while the selecting terminal b of the switch S1 is connected to both the C output terminal of the picture memory 500 and the selecting terminal "a" of the switch S6. Further, the selecting terminal "b" of the switch S2 is connected to both the Y output terminal of the picture memory 500 and the selecting terminal "a" of the switch S5.

Further, the selecting terminal "a" of the switch S3 is connected to the selecting terminal "b" of the switch S5, and the selecting terminal "a" of the switch S4 is connected to the selecting terminal "b" of the switch S6.

Further, clock signals Y-AD-CLK and C-AD-CLK are output in synchronization with the incoming video signals, while clock signals Y-CLK and C-CLK, and the horizontal synchronizing signals and vertical blanking signals of the percent block are output in synchronization with the PAL system when converting from the PAL system to the NTSC system.

This is because of the following reasons. That is, when line-conversions are carried out from the PAL system to the NTSC system, the conversions are carried out in the order of; (A/D conversion-(line-conversion)-(storing into picture memory)-(D/A conversion). On the other hand, when converting from the NTSC system to the PAL system, the conversions are carried out in the order of (A/D conversion) (storing into picture memory)-(line conversion)-(D/A conversion).

When converting from the NTSC system to the PAL system, the reason for first storing the input video signals into the picture memory is that the time actually has to be extended in order to convert a small number of scanning lines to a larger number of scanning lines.

That is, the incoming signals have to be input more slowly relative to the converted signals. However this is impossible, and therefore, the input video signals are first stored into the picture memory, the reading is made whenever it is needed. In the present invention as described above, when the input signals are the signals of the PAL system if these signals are to be converted into the NTSC system, the switches S1–S6 of FIG. 1 are connected to the selecting terminals "a".

Then the Y signals of the PAL system are input into the Y A/D converter 110 to be converted into digital signals by it, and then, are stored into the line memory 210 after passing through the switch S1. The Y signals are delayed by 1H by the line memory 210, and the signals thus delayed are input into the first arithmetic unit 410 through the input terminal (1N).

Meanwhile, the C signals output from the multiplexer MUX by multiplexing R-Y and B-Y signals are converted into digital signals by the C A/D converter 120, and are stored into the line memory 220 after passing through the switch S2. Then these signals are delayed by 1H by the line memory 220, and then, are input into the third arithmetic unit 430 through the input terminal (1N).

The output of the Y A/D converter 110 is also input into the second arithmetic unit 420 through the switch S1, while the output of the C A/D converter 120 is also input into the fourth arithmetic unit 440 through the switch S2.

Meanwhile, the output of the percent block 300 is input into the second and fourth arithmetic units 420 and 440, to cause the arithmetic units 420 and 440 to provide different constants in accordance with the number of the H lines within the six unit grouping of PAL lines.

The output of the percent block 300 is also input into the first and third arithmetic units 410 and 430, after being inverted by inverters I1–I8.

The 6-bit counter 310 of the percent block 300 generates logic outputs that are repeated each period of 6 horizontal synchronizing signals, and is cleared at a vertical blanking logic "L", thereby achieving a vertical alignment of synchronization.

The signals from output terminals of the counter 310 are input into the logic combining circuit 320. This logic combining circuit 320 receives signals with a positive level in the case of the NTSC system having 525 scanning lines, and receives signals with a negative level in the case of the PAL system having 625 lines.

| Constant of 5n 0.833 ... = 0.1101 | 010101 = D5 |
|---|---|

In the above, if the left side of the decimal point of the binary number is discarded and if only the 8 bits are taken to turn them to a hexadecimal number, then the respective numbers become 2A, 55, 80, AA and D5.

The counter 310 is a 3 bit binary counter. The 3 bit binary counter 310 provides 8 different output signals. However, only 6 different signals are output. This is because 2 of the signals are a result of "Don't care conditions". The 8 bit data of the logic combining circuit 320 is output by multiple of 6 and it is also output a horizontal synchronizing signal. It is expressed as follows;

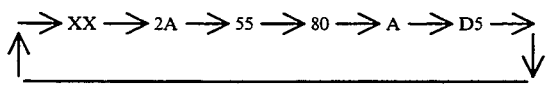

wherein "XX" represents "don't care condition".

Thus the numbers are formed by taking the 8 bits output from percent terminals PER0, PER1, PER2, ..

TABLE 3

| 525/625 | C | B | A | \multicolumn{8}{c}{Percent output} | Hex | MCH | Converting mode |
|---|---|---|---|---|---|---|---|---|---|---|---|---|---|---|
| | | | | 7 | 6 | 5 | 4 | 3 | 2 | 1 | 0 | | | |
| 0 | 0 | 0 | 0 | × | × | × | × | × | × | × | × | ×× | L | PAL input |
| 0 | 0 | 0 | 1 | 0 | 0 | 1 | 0 | 1 | 0 | 1 | 0 | 2A | H | ↓ |
| 0 | 0 | 1 | 0 | 0 | 1 | 0 | 1 | 0 | 1 | 0 | 1 | 55 | H | NTSC |
| 0 | 0 | 1 | 1 | 1 | 0 | 0 | 0 | 0 | 0 | 0 | 0 | 80 | H | output |
| 0 | 1 | 0 | 0 | 1 | 0 | 1 | 0 | 1 | 0 | 1 | 0 | AA | H | |
| 0 | 1 | 0 | 1 | 1 | 1 | 0 | 1 | 0 | 1 | 0 | 1 | D5 | H | |
| 0 | 1 | 1 | 0 | × | × | × | × | × | × | × | × | ×× | × | |
| 0 | 1 | 1 | 1 | × | × | × | × | × | × | × | × | ×× | × | |
| 1 | 0 | 0 | 0 | 1 | 1 | 1 | 1 | 1 | 1 | 1 | 1 | FF | H | NTSC |
| 1 | 0 | 0 | 1 | 1 | 1 | 0 | 0 | 1 | 1 | 0 | 0 | CC | H | input |
| 1 | 0 | 1 | 0 | 1 | 0 | 0 | 1 | 1 | 0 | 0 | 1 | 99 | H | ↓ |
| 1 | 0 | 1 | 1 | 0 | 1 | 1 | 0 | 0 | 1 | 1 | 0 | 66 | H | PAL |
| 1 | 1 | 0 | 0 | 0 | 0 | 1 | 1 | 0 | 0 | 1 | 1 | 33 | H | output |
| 1 | 1 | 0 | 1 | 0 | 0 | 0 | 0 | 0 | 0 | 0 | 0 | 00 | L | |
| 1 | 1 | 1 | 0 | × | × | × | × | × | × | × | × | ×× | × | |
| 1 | 1 | 1 | 1 | × | × | × | × | × | × | × | × | ×× | × | |

As shown in Table 3 above, the counter 310 produces 8 outputs regardless of whether PAL or NTSC signals are input, but the logic combining circuit 320 accepts only six input values.

Referring to Table 3 and FIG. 2, when the signal of the PAL system is input, a hexadecimal signal is output by selecting terminal (line $\overline{625}$) of the logic circuit 320 (See, Table 3). When the signal of the NTSC system is input, a hexadecimal signal is output by selecting terminal (line 525) of the logic circuit 320 (see, Table 3). The reason why the logic circuit 320 provides 8 bits is because the hexadecimal signal is represented using 8 bits (e.g., 0011(3) 0010(2) ).

The output of the counter 310 is converted into percent outputs by the logic combining circuit 320.

When converting from the PAL system to the NTSC system, the constants of the right side terms of the converting formula in Table 1 can be converted into binary and hexadecimal numbers as follows.

| Constant of 1n 0.166 ... = 0.0010 | 101010 ... = 2A |
|---|---|
| Constant of 2n 0.33 ... = 0.0101 | 010101 ... = 55 |
| Constant of 3n 0.5 ... = 0.1000 | 0000 = 80 |
| Constant of 4n 0.66 ... = 0.1010 | 1010 = AA |

. PER7 of the logic combining circuit 320. Then the outputs are input into the second and fourth arithmetic units 420 and 440, and then, are input through the inverters I1–I8 into the first and third arithmetic units 410 and 430.

The first arithmetic unit 410 performs multiplications for the left side terms of the converting formula of Table 1, while the second arithmetic unit 420 performs multiplications for the right side terms of the same formula.

That is, the first arithmetic unit 410 generates an output after carrying out computations on the 1p line (which is a 1H delayed Y signal) in relation with the constant of 1101 0101 of Table 3, which is output from the percent block 300. The second arithmetic unit 420 carries out computations on the 2p line in relation with 0010 1010 which is output by the percent block 300.

The output of the first arithmetic unit gives a value of $1p \times 0.833$, while the output of the second arithmetic unit 420 gives a value of $2p \times 0.166$.

Therefore, the above values are summed up by the adding section 450, so that a Y output for the 1n line with a value of "1" should be output.

The third arithmetic unit 430 generates an output after carrying out computations on the 1p line (which is a 1H delayed C signal) in relation with the constant of 1101 0101 of Table 3, which is output from the percent block 300. The fourth arithmetic unit 440 generates an output after carrying out computations on the 2p line in relation with the value 1101 0101 which is output from the percent block 300.

Therefore, the output of the third arithmetic unit 430 is same as that of the first arithmetic unit 410, while the output of the fourth arithmetic unit 440 is same as that of the second arithmetic unit 420.

These values are summed up by the adding section 460, so that C signals of the 1n line should be output.

The Y and C signals which are output after conversions are input into the switches S3 and S4 respectively, and further, they are finally output respectively through the switches S5 and S6 to the D/A converter.

As is apparent from the above descriptions, the constants of the right side terms and the constants of the left side terms of Table 1 lie in an inverted relation with each other.

As to the 2p line which is the next scanning line, the Y and C signals are respectively delayed by 1H in the line memories 210 and 220, and therefore, the constants of the formula for the 2n line in Table 1 are output from the percent block 300. Further, these output values are input into the first, second, third and fourth arithmetic units 410, 420, 430 and 440, and therefore, the Y and C signals for the 2n line are output from the adding sections 450 and 460 respectively.

The 3n, 4n and 5n lines are also subjected to computations through the same operations in relation with the constants which are supplied from the percent block 300, thereby forming Y and C signals for the respective lines.

However, for the 7p lines, the memory control holding signal CMCH which is output from the percent block 300 comes to have logic "L" and therefore, the picture memory 500 which stores the Y and C outputs is put to a stay state. Therefore no computation is carried out in relation with the 6p lines, but the 7p line is computed in relation with the 8p lines, thereby forming Y and C signals for the 6n line.

Thus, the percent block 300 outputs the same constant for every period of 6 lines, and therefore, the same constant as that of the 1n to 5n lines is provided. Consequently, Y and C signals are formed respectively, with the result that only 243 lines are output from among 288 lines of one field, thereby forming the scanning lines of the NTSC system.

On the other hand, in the case where the input signals are those of the NTSC system, the switches S1–S6 of FIG. 1 are all connected to the selecting terminal "b". Therefore, Y and C signals are converted to digital signals respectively by the Y A/D converter 110 and the C A/D converter 120 as in the case of the PAL system. Then the Y signals are supplied through the selecting terminal "a" of the switch S1 and the selecting terminal "b" of the switch S3 to the picture memory 500 to be stored there, while the C signals are supplied through the selecting terminal "a" of the switch S2 and the selecting terminal "b" of the switch S4 to the picture memory 500 to be stored there.

The stored Y and C signals are read out and are input to the third and the fourth arithmetic units 420 and 440 through the setting terminal "b", the switch S1 and the switch S2, and at the same time are input to line memories 210 and 220 which are delayed.

Meanwhile, the constants for the respective lines output from the percent block 300 are supplied to the second and fourth arithmetic units 420 and 440, and also supplied to the first and the third arithmetic units 410 and 430 through the inverters I1–I8.

The counter 310 of the percent block 300 counts the horizontal synchronizing signals to output the result to the logic combining circuit 320. Then, because it is the NTSC system, a logic "1" is input into the logic combining circuit 320 as shown in Table 3 (in case that scanning lines 525 is input).

Of the outputs of the counter 310, only 6 of them are valid, while 2 of them are not taken because it doesn't care condition. In the case where a conversion is made from the NTSC system to the PAL system, the constants of the right side terms of the converting formula in Table 2 can be converted into binary and hexadecimal numbers as follows.

| Constant of 1p | 1 = 0.1111 | 1111 11... = FF |
| Constant of 2p | 0.8 = 0.1100 | 1100 1... = CC |
| Constant of 3p | 0.6 = 0.1001 | 1001 1... = 99 |
| Constant of 4p | 0.4 = 0.0110 | 0110 0... = 66 |
| Constant of 5p | 0.2 = 0.0011 | 0011 0... = 33 |
| Constant of 6p | 0 = 0.0000 | 0000 = 00 |

In the above, if the left side of the decimal point is discarded, and if only the underlined 8-bit portions are converted into hexadecimal numbers, they become FF, CC, 99, 66, 33 and 00 respectively. Thus, the output of the logic combining circuit 320 is sequentially performed.

At this time, the values of the 8 bits which are taken are output from the percent output terminals PER0, PER1, PER2, ..., PER7 of the logic combining circuit 320 to be input into the second and fourth arithmetic units 420 and 440, while they are also input through the inverters I1, I2, ..., I8 into the first and third arithmetic units 410 and 430.

For the Y and C signals, the first and third arithmetic units 410 and 430 carry out computations on the left side terms of the converting formula of Table 2, while the second and fourth arithmetic units 420 and 440 carry out computations on the right side terms of the formula of Table 2 for the Y and C signals.

Because the 1n line is delayed by 1H by the line memory 210, the first arithmetic unit 410 outputs no signal for it. Under this condition, the outputs of the percent block 300 have all a logic "1" as shown in Table 3, but they are all converted to a logic "0" by the inverters I1, I2, ..., I8. Therefore, the output of the first arithmetic unit 410 becomes 0, and the input of the third arithmetic unit 430 also has the same logic as that of the first arithmetic unit 410, so that its output should become 0.

Under this condition, the 1n outputs of the Y A/D converter 110 and the C A/D converter 120 are stored into the picture memory 500 through the selecting terminal "b" of the switches S1 and S2, and are input into the second and fourth arithmetic units 420 and 440.

All the outputs of the percent block 300 are provided with signals of a logic "1", and signals of the 1p line are formed for the Y and C signals, before they are output through the adding sections 450 and 460.

These Y and C signals for the 1p line are supplied respectively through the selecting terminal "b" of the switches S5 and S6 to the D/A converter.

Then the 2n line which is the next scanning line is input into the second and fourth arithmetic units 420 and 440 after converting the A/D converting circuit 100. Then the line memory 200 outputs 1H delayed signals of the in line to the first and third arithmetic units 410 and 430 which respectively carry out computations after receipt of the output constants from the percent block 300. These computed values are summed up by the adding sections 450 and 460, with the result that Y and C signals of the 2p line are output.

Then, the 3p, 4p and 5p lines are also computed based on the same procedure and in relation with the constants furnished by the percent block 300, thereby forming Y and C signals for the respective lines.

Thereafter, at the 6p line, the percent outputs PER0, ..., PER7 of the percent block 300 are all shifted to a logic "0", with the result that there is no computed output from the second and fourth arithmetic units 420 and 440.

The first and third arithmetic units 410 and 430 output 1H delayed signals for the 5n line after receipt of them from the line memory 200. To these outputs, there are furnished constants which are inverted by the inverters I1, I2, ..., I8, and the result computation outputs for them are output through the adding sections 450 and 460, thereby forming Y and C signals for the 6p line.

Further, at the 6p line, the memory control holding signal MCH which is output from the logic combining circuit 320 of the percent block 300 is shifted to a logic "L", so that the reading from the picture memory 500 should be temporarily halted.

For the lines thereafter, the same procedure as that for the 1p to 6p lines is applied, thereby forming an output of the PAL system consisting of 288 lines per field as against to 243 lines per field.

Meanwhile, the first, second, third and fourth arithmetic units 410, 420, 430 and 440 of the arithmetic circuit 400 have the same constitutions with each other and same as that of FIG. 3, and the operations of these arithmetic units will be described in detail referring to FIG. 3.

First, 1H delayed 8-bit signals of the line memory 200 and 8-bit signals of the A/D converting circuit 100 are supplied to the first input terminals of the multiplexers MUX1-MUX8 through the buffer BF1. The second input terminals of the multiplexers MUX1-MUX8 are respectively connected to earth terminals. Thus, if the logic signal "0" is provided to the selecting terminal (S), the multiplexers MUX1-MUX8 output the logic signal "0" of the second input terminal, while the logic signal "1" is provided to the selecting terminals (S), the multiplexers MUX1-MUX8 output the 8-bit data signals input from the first input terminal through the first Buffer BF1.

The percent output terminals PER0-PER7 of the percent block 300 are provided to the selecting terminal (S) of the multiplexers MUX1-MUX8, so that the input signal of the multiplexers MUX1-MUX8 is selected.

In the case where the output of the percent block 300 is 00101010 as shown in Table 3, the outputs of the multiplexers MUX1, MUX2, MUX4, MUX6 and MUX8 are all shifted to a logic "0", while the multiplexers MUX3, MUX5 and MUX7 output 8-bit data after receipt of inputs for them from the buffer BF1.

The 8-bit output of the multiplexer MUX1 is input into the input terminal A of the 9-bit adder ADD1, after the data is incremented by 1 bit.

Meanwhile, the 8-bit output of the multiplexer MUX2 is input into the input terminal B of the adder ADD1 with the same bit number, and these data are added with the signals which are input through the input terminal A, before being output as 9-bit data.

The multiplexer MUX3 discards the lowermost bit, and outputs 7-bit data to the lower 7 bits of input terminal A of the adder ADD2 by taking the upper 7 bits, while the multiplexer MUX4 takes the upper 6 bits, and inputs them to the lower 6 bits of the input terminal A of the adder ADD2. The adder ADD2 sums up the outputs of the multiplexers MUX3 and MUX4 in order to output 7-bit data.

The multiplexer MUX5 inputs the upper 5 bits into the lower 5 bits of the input terminal A of the adder ADD3, while the multiplexer MUX6 inputs the upper 4 bits into the lower 4 bits of the input terminal B of the adder ADD3. Then the adder ADD3 sums up the output signals of the multiplexers MUX5 and MUX6 in order to output 5-bit data.

Further, the multiplexer MUX7 inputs the upper 3 bits into the lower 3 bits of the input terminal A of the adder ADD4, while the multiplexer MUX8 inputs the upper 2 bits into the lower 2 bits of the input terminal B of the adder ADD4. Then the adder ADD4 sums up the output signals of the multiplexers MUX7 and MUX8 in order to output 3-bit data.

The 9-bit output of the adder ADD1 is input into the input terminal A of the adder ADD10, while the 7-bit output of the adder ADD2 is input into the input terminal B so as for 10-bit data to be output.

The 5-bit output of the adder ADD3 is input into the input terminal A of the adder ADD20, while the 3-bit output of the adder ADD4 is input into the input terminal B of the adder ADD20, thereby providing 6-bit data.

The adder ADD30 sums up the 10-bit signals of the adder ADD10 and the 6-bit signals of the adder ADD20 in order to output 8-bit data, while the buffer BF2 outputs the data of the adder ADD30 in synchronization with clocks.

Thus, the first, second, third and fourth arithmetic units 410, 420, 430 and 440 output the computed results by carrying out the above described operations.

As a computing example, if it is assumed that the signal input into the buffer BF1 is "1111 1111", and that the constant output from the percent block 300 is 0.9999 ..., then 0,999 ... is converted into a binary number of 0.111 ...

The signal input from the first buffer BF1 and the signal output from the percent block 300 are multiplied by the multiplexers MUX1-MUX8 and the adders ADD1-ADD4, ADD10-ADD30. The signal output from the first buffer BF1 are shifted by 1 bit each by the multiplexers MUX1-MUX8 as follows.

| Data No. | D7 D6 ... | ... D1 D0 |
| --- | --- | --- |
| Signal value | 1 1 1 1 | 1 1 1 1 |
| 1-bit shifted | 0 1 1 1 | 1 1 1 1.1 |
| 2-bit shifted | 0 0 1 1 | 1 1 1 1.1 1 |
| 3-bit shifted | 0 0 0 1 | 1 1 1 1.1 1 |
| : | : | : |
| 7-bit shifted | 0 0 0 0 | 0 0 0 1.1 1 |
| 8-bit shifted | 0 0 0 0 | 0 0 0 0.1 1 |

The 1-bit shifted and 2-bit shifted values are added up by the 9-bit adder ADD1, so that its resultant value is 1011 1111. 01. That is, when the shifted bit for the binary expression of the constant is "1", then the shifted value is added, while, if it is "0", "00" is added in place of the shifted value.

If these additions are repeated, then it becomes equivalent to multiplying the constant. Of course, if an exact result is to be obtained, it should be done such that an increment is made as much as the shifted value, and the numerals below the decimal point are extended.

Accordingly, the 3-bit shifted values and the 4-bit shifted values are added up by the 7-bit adder ADD2, before being output in the form of 7-bit data.

Further, the 5-bit and 6-bit shifted values and the 7-bit and 8-bit shifted values are respectively added up by the 5-bit adder ADD3 and the 3-bit adder ADD4, before being output in 5-bit and 3-bit data respectively.

Further, the 10-bit adder ADD10 outputs 10-bit data after adding up the outputs of the adders ADD1 and ADD2, while the 6-bit adder ADD20 outputs 6-bit data after adding up the outputs of the adders ADD3 and ADD4.

After adding up the outputs of the adders ADD10 and ADD20, the 10-bit adder ADD30 discards the lower two bits, i.e., the numerals below the decimal point, before providing its added data.

Accordingly, the buffer BF2 outputs a value which is formed by multiplying the output of the buffer BF1 by the constant of the percent block 300, thereby giving a value which is shifted by 1H.

This 1H value is equivalent to the value of the right side terms or the left side terms of the converting formulas of Tables 1 and 2.

For example, when a computation is performed on the in line of Table 1, an output value of $1p \times 0.833$ or $2p \times 0.166$ is output.

Thus the computed results of the first, second, third and fourth arithmetic units 410, 420, 430 and 440 are output in such a manner that the adding section 450 adds up the outputs of the first and second arithmetic units 410 and 420 in order to output converted Y signals, and that the adding section 460 adds up the outputs of the third and fourth arithmetic units 430 and 440 in order to output converted C signals.

Thus when a conversion is made from the PAL system to the NTSCH system, the Y and C signals of the PAL system are converted into digital signals by the A/D converting circuit 100, and then, they are further converted by the line memory 200, by the percent block 300 and by the arithmetic circuit 400. Then the signals are stored into the picture memory 500, and then, are output to the D/A converter.

On the other hand, when a conversion is made from the NTSC system to the PAL system, the Y and C signals of the NTSC system are converted into digital signals by the A/D converting circuit 100, and then, the signals are stored into the picture memory 500. Then the stored data are read out to pass through the line memory 200, the percent block 300 and the arithmetic circuit 400, before being output to the D/A converter.

In the above, there were described the conversions from the NTSC system to the PAL system and vice versa, but the present invention can be applied to conversions between other systems.

According to the present invention as described above, when a conversion is made from the NTSC system to the PAL system or vice versa, the ratio between the horizontal scanning lines of the two systems applied in such a manner that, when a conversion is made from the PAL system to the NTSC system, the ratio of $N+1$ lines is varied by 2 lines to output converted N lines, and that when a conversion is made from the NTSC system to the PAL system, the ratio of N lines is varied by 2 lines to output converted $N+1$ lines. Therefore, when carrying out the line conversions, there occurs no loss of video data, but the regenerating rate of the display data becomes very high, thereby improving the quality of color television.

What is claimed is:

1. A method for converting the video containing horizontal lines of a field of lines in a PAL system into video containing horizontal lines of a field of lines in an NTSC system comprising the steps of:
   (a) dividing said video containing lines in said PAL system into conversion units of $N+1$ lines per conversion unit;
   (b) delaying said $N+1$ lines by an amount corresponding to one horizontal line (1H);
   (c) combining said delayed and undelayed $N+1$ PAL lines, each delayed line being combined with the succeeding undelayed line, to form N NTSC lines; the said combining of each delayed and succeeding undelayed line being such as to cause each NTSC line to constitute a varying portion of said delayed and undelayed lines; and
   (d) repeating said delaying and combining steps for each of said conversion units of $N+1$ lines, to form a field of NTSC lines.

2. The method according to claim 1 wherein the step of combining comprises, for each delayed line j and successive undelayed line $j+1$;
   multiplying said delayed line j by a constant $K_1$;
   multiplying said undelayed line $j+1$ by a constant $K_2$; and
   summing the products of said multiplications to form a single NTSC line, wherein the sum of the constants $K_1$ and $K_2$ is substantially equal to 1, and wherein the values of constants $K_1$ and $K_2$ vary depending on the line numbers within said $N+1$ unit that are being combined.

3. The method according to claim 2 wherein N is equal to 5, and wherein each unit of six PAL lines, $1p$, $2p \ldots 6p$, is converted into five NTSC lines $1n, 2n, \ldots 5n$, containing the data from said six PAL lines.

4. The method of claim 3, wherein said six PAL lines are combined as follows to form said five NTSC lines:

$$(1p)(K_{1,1}) + (2p)(K_{2,1}) = 1n$$

$$(2p)(K_{1,2}) + (3p)(K_{2,2}) = 2n$$

$$(3p)(K_{1,3}) + (4p)(K_{2,3}) = 3n$$

$$(4p)(K_{1,4}) + (5p)(K_{2,4}) = 4n$$

$$(5p)(K_{1,5}) + (6p)(K_{2,5}) = 5n$$

wherein $K_{1,n} + K_{2,n} = 1$, for all values of n from 1 through 5.

5. The method of claim 4 wherein the values of K are:

$$(K_{1,1}) = (K_{2,5}) = 0.833$$

$$(K_{2,1}) = (K_{2,5}) = 0.166$$

$$(K_{1,2}) = (K_{2,4}) = 0.66$$

$$(K_{2,2}) = (K_{1,4}) = 0.33$$

$$(K_{1,3}) = (K_{2,3}) = 0.5.$$

6. A method for converting the video containing horizontal lines of a field of lines in an NTSC system into video containing horizontal lines of a field of lines in a PAL system, comprising the steps of:
   (a) dividing said lines of the NTSC field into conversion units of N lines of NTSC per conversion unit;
   (b) converting each of said conversion units into N+1 lines of a PAL system having the same video data as carried by the N lines of said conversion unit, wherein the step of converting comprises:
      (i) delaying all said N lines of said conversion unit by one horizontal line (1H);
      (ii) combining each said undelayed line and a preceedingly numbered delayed line of said conversion unit to form a single PAL line, the result of all such combinations for said conversion unit resulting in N+1 PAL lines.

7. The method of claim 6 wherein the step of combining said two successive lines of NTSC lines, comprises, for each delayed line j and undelayed line j+1;
   multiplying said delayed line j by a constant $K_{1,j}$, and said undelayed line by a constant $K_{2,j}$,
   summing the products of said multiplications to form a single PAL line, wherein the sum of the constants $K_{1,j}+K_{2,j}$ is substantially equal to 1 and wherein the values of constants $K_{1,j}$ and $K_{2,j}$ vary depending on the line numbers within said conversion units.

8. The method according to claim 7 wherein N is equal to 5 and wherein each unit of five NTSC lines, 1n, 2n, 3n, 4n, 5n is converted into six lines of PAL, 1p, 2p, ... 6p.

9. The method of claim 8 wherein said five NTSC lines are combined as follows to form six PAL lines:

$(-)(K_{1,1})+(1n)(K_{2,1})=1p$ $(1n)(K_{1,2})+(2n)(K_{2,2})=2p$ $(2n)(K_{1,3})+(3n)(K_{2,3})=3p$ $(3n)(K_{1,4})+(4n)(K_{2,4})=4p$ $(4n)(K_{1,5})+(5n)(K_{2,5})=5p$ $(5n)(K_{1,6})+(-)(K_{2,6})=6p.$

10. The method of claim 9 wherein said constants $K_{1,j}$ and $K_{2,j}$ are as follows:

$(K_{1,1})=(K_{2,6})=0$ $(K_{2,1})=(K_{1,6})=1$ $(K_{1,2})=(K_{2,5})=0.2$ $(K_{2,2})=(K_{1,5})=0.8$ $(K_{1,3})=(K_{2,4})=0.4$ $(K_{2,3})=(K_{1,4})=0.6$

11. A scanning line converting apparatus for video signals, comprising:
   an A/D converting circuit for converting Y and C signals to digital signals;
   line memory means for storing 1H lines, and for providing 1H delayed data;
   a percent block for providing a ratio for every 1H line;
   an arithmetic circuit for providing line-converted outputs after computing outputs in response to respective line constants based on said ratios provided by said percent block, the digital signals of said Y and C signals of said A/D converting circuit, and said 1H delayed output of said line memory means; and
   a picture memory for receiving the output of said arithmetic circuit, and for storing and providing picture data under the control of memory control holding signals of said percent block.

12. The scanning line converting apparatus for video signals as claimed in claim 11, wherein said percent block comprises:
   a 6-bit counter 310 for repeatedly counting horizontal synchronizing signals to count 6 outputs using 6 horizontal synchronizing signals as the periods, and for being cleared by vertical blanking signals; and
   a logic combining circuit 320 for receiving low signals under input signals of 625 lines, for receiving high signals under input signals of 525 lines, for providing constants for respective horizontal scanning lines through 8 percent output terminals PER0, PER1, ..., PER7 after logic-combining the outputs of said counter 310, and for generating control holding signals to said line memory means 200.

13. The scanning line converting apparatus for video signals as claimed in claim 12, wherein said arithmetic circuit 400 comprises:
   an arithmetic unit 410 for receiving Y signals of 1H delayed scanning lines of said line memory means 200, and for computing said Y signals in relation with inverted signals of said percent block 300 before providing it;
   an arithmetic unit 420 for receiving 1H delayed the digital converted Y signals for the current line from said A/D converting circuit 100, and for computing said Y signal data in relation with signals furnished by said percent block 300;
   an arithmetic unit 430 for performing computation by using C signals of 1H delayed scanning lines and an inverting signals of percent block output signals;
   an arithmetic unit 440 for receiving digital converted C signals for the current lines from said A/D converting circuit 100, and for computing signals of said percent block 300 in relation with said C signal data;
   an adding section 450 for providing Y signals of converted scanning lines after summing up the outputs of said arithmetic units 410 and 420; and
   an adding section 460 for providing C signals of converted scanning lines after summing up the outputs of said arithmetic units 430 and 440.

14. The line converting apparatus for video signals as claimed in claim 13, wherein each of said arithmetic units 410–440 comprises:
   a buffer BF1 for receiving 8-bit scanning line data from said A/D converting circuit 100 or from said line memory;
   multiplexers MUX1–MUX8 for receiving said 8-bit data from said buffer BF1, and for generating outputs after receipt of 8 logic signals simultaneously output from said percent block 300;
   adders ADD1–ADD4 of 9 bits, 7 bits, 5 bits and 3 bits for receiving two outputs from among said multiplexers MUX1 and MUX2, and for receiving data into their lower bits after sequentially decreasing the upper bits of the outputs of said multiplexers MMUX1–MUX8;

adders ADD10 and ADD20 of 10 bits for receiving the 9-bit, 7-bit, 5-bit and 3-bit outputs of said adders ADD1-ADD4 of 9 bits, 7 bits, 5 bits and 3 bits after being increment the number of digits;

an adder ADD30 for receiving both of the outputs of said adders ADD10 and ADD20, and for providing an 8-bit output; and a buffer BF2 for receiving the output of said adder ADD30, and for providing computed output signals.

* * * * *